United States Patent
Kappelman et al.

(10) Patent No.: US 12,538,867 B2
(45) Date of Patent: Feb. 3, 2026

(54) MOWER WITH CURTAIN ASSEMBLY

(71) Applicant: DEERE & COMPANY, Moline, IL (US)

(72) Inventors: Jacob D. Kappelman, Bloomfield, IA (US); David V. Rotole, Bloomfield, IA (US); Logan T. Pronschinske, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 781 days.

(21) Appl. No.: 17/818,732

(22) Filed: Aug. 10, 2022

(65) Prior Publication Data
US 2024/0049632 A1   Feb. 15, 2024

(51) Int. Cl.
| | |
|---|---|
| *A01D 34/82* | (2006.01) |
| *A01D 34/66* | (2006.01) |
| *A01D 75/18* | (2006.01) |
| *A01D 75/20* | (2006.01) |

(52) U.S. Cl.
CPC .......... *A01D 34/828* (2013.01); *A01D 75/18* (2013.01)

(58) Field of Classification Search
CPC .. A01B 73/067; A01D 34/828; A01D 34/661; A01D 34/63; A01D 34/66; A01D 34/84; A01D 75/18; A01D 75/20; A01D 75/185
See application file for complete search history.

(56) References Cited

U.S. PATENT DOCUMENTS

| | | | |
|---|---|---|---|
| 2,259,889 A * | 10/1941 | Hilblom | A01D 75/185 56/320.1 |
| 5,203,150 A | 4/1993 | Ryken et al. | |
| 5,727,371 A | 3/1998 | Kieffer et al. | |
| 5,761,890 A | 6/1998 | Lehman et al. | |
| 5,896,733 A | 4/1999 | Neuerburg et al. | |
| 10,674,661 B2 * | 6/2020 | Merkt | A01D 34/84 |
| 10,912,248 B2 * | 2/2021 | Lopan | A01B 73/067 |

FOREIGN PATENT DOCUMENTS

| | | |
|---|---|---|
| EP | 0706750 A1 | 4/1996 |
| EP | 3766327 A1 | 1/2021 |
| JP | 6687971 B2 | 4/2020 |

OTHER PUBLICATIONS

Extended European Search Report and Written Opinion issued in European Patent Application No. 23185450.6 dated May 24, 2024, in 08 pages.

* cited by examiner

*Primary Examiner* — Joseph M Rocca
*Assistant Examiner* — Robert E Pezzuto

(57) ABSTRACT

A lateral offset mower implement may include a mower support frame, a pivot head, a curtain support apparatus, and a curtain. The mower support frame has a first end attached to a work vehicle and a second end spaced from the first end along a central longitudinal axis of the mower support frame. The pivot head is coupled to the mower support frame proximate the second end thereof. The pivot head defines a first curtain axis, and the first curtain axis is vertical during operation. The curtain support apparatus has a primary curtain support member attached to the pivot head and extending away from the pivot head to a distal end. The curtain is supported by the curtain support apparatus. The primary curtain support member is pivotably attached to the pivot head for relative rotation between the primary curtain support member and the pivot head about the first curtain axis.

17 Claims, 13 Drawing Sheets

MOWER WITH CURTAIN ASSEMBLY

RELATED APPLICATIONS

N/A.

FIELD OF THE DISCLOSURE

The present disclosure relates generally to a mower implement, especially to a lateral offset mower implement.

BACKGROUND OF THE DISCLOSURE

A lateral offset mower implement may be attached to a work vehicle, such as a tractor, to cut the crop. The later offset mower implement may have a cutter bar extending in a direction perpendicular to a direction of travel during operation. The cutter bar has cutting elements for cutting the crop. The lateral offset mower implement may include a curtain extending in the same direction of the cutter bar and defining a boundary for preventing debris (i.e., cut crop or other disturbed material) from projecting far away from the cutter bar. As such, the curtain restrains the cut crop material within the boundary defined by the curtain, thereby defining or forming the windrow.

SUMMARY OF THE DISCLOSURE

According to an aspect of the present disclosure, a lateral offset mower implement may include a mower support frame, a pivot head, a curtain support apparatus, and a curtain. The mower support frame has a first end attached to a work vehicle and a second end spaced from the first end along a central longitudinal axis of the mower support frame. The pivot head is coupled to the mower support frame proximate the second end thereof. The pivot head defines a first curtain axis, and the first curtain axis is generally vertical during operation. The curtain support apparatus has a primary curtain support member attached to the pivot head and extending away from the pivot head to a distal end. The curtain is supported by the curtain support apparatus. The primary curtain support member is pivotably attached to the pivot head for relative rotation between the primary curtain support member and the pivot head about the first curtain axis.

According to an aspect of the present disclosure, a lateral offset mower implement may include a mower support frame, a head, a curtain support apparatus, and a curtain. The mower support frame has a first end attached to a work vehicle and a second end spaced from the first end along a central longitudinal axis of the mower support frame. The head is coupled to the mower support frame proximate the second end thereof. The curtain support apparatus has a primary curtain support member attached to the head and extending away from the head to a distal end and a curtain support frame rotatable relative to the primary curtain support member. The curtain is supported by the primary curtain support member and the curtain support frame.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION OF THE DRAWINGS

Figure 1A:
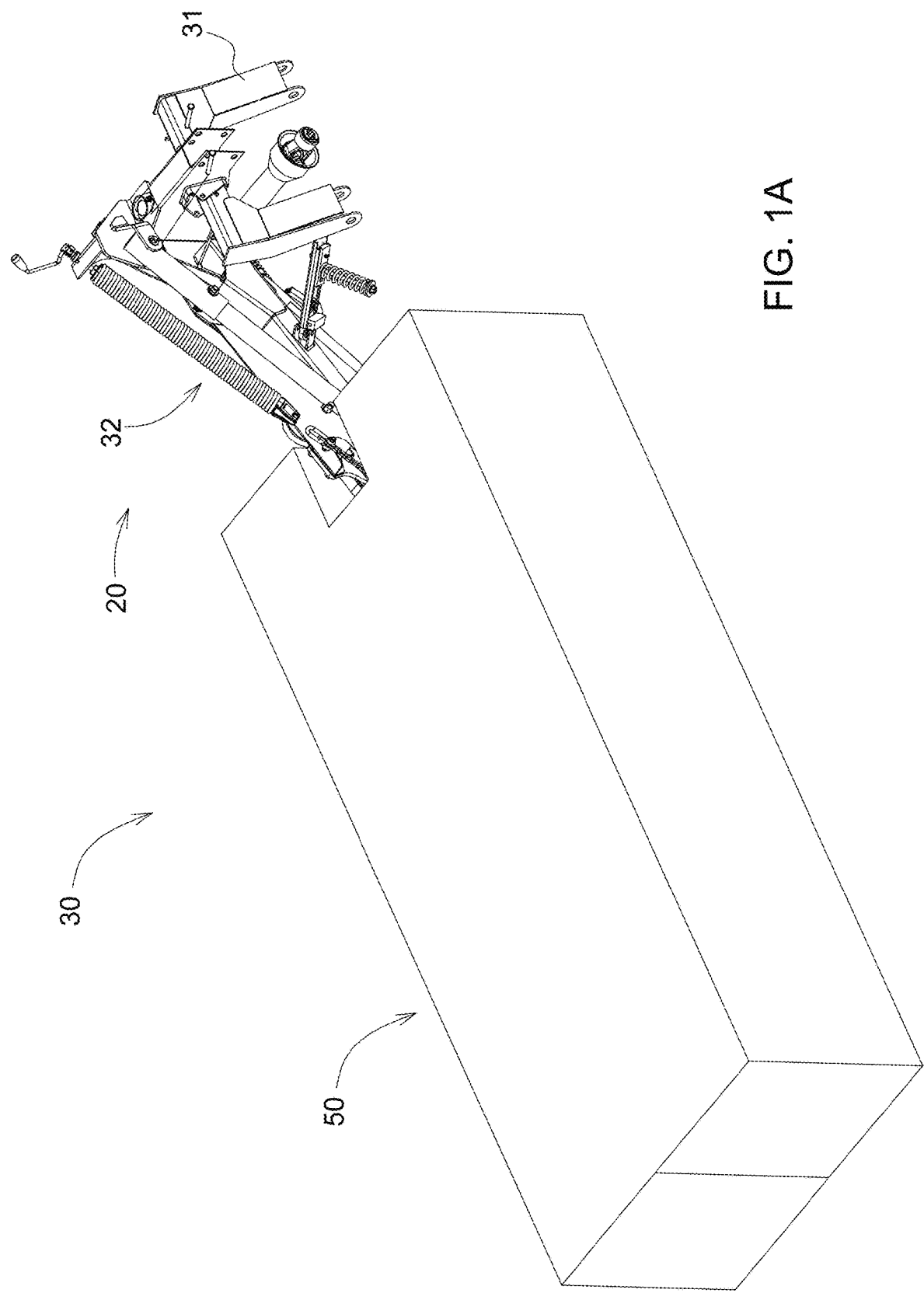
FIG. 1A is a perspective view of a lateral offset mower implement.
Figure 1B:
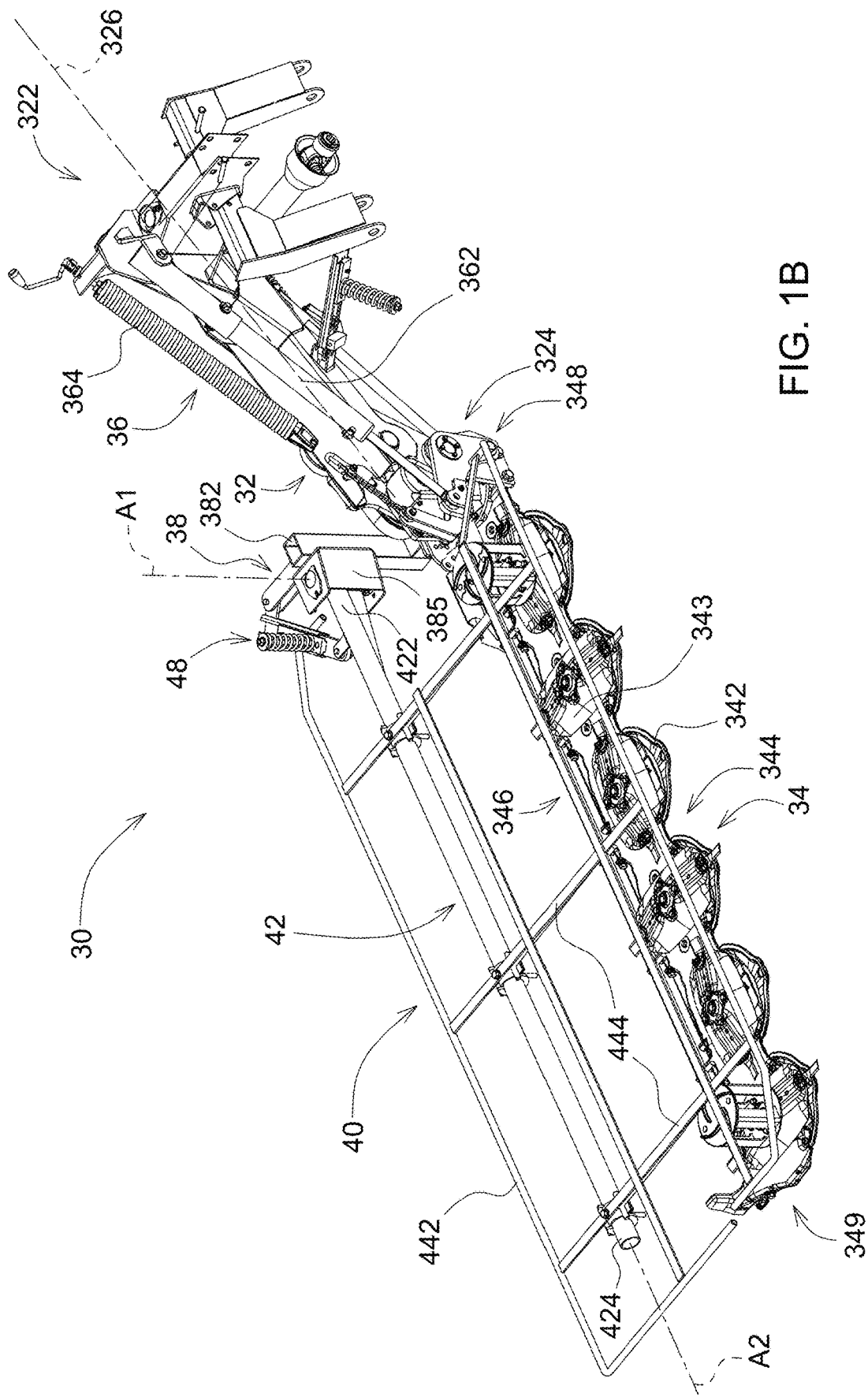
FIG. 1B is a perspective view of the lateral offset mower implement of FIG. 1A with a curtain omitted for illustration.

Referring to FIGS. 1A and 1B, a lateral offset mower implement 30 is introduced. The lateral offset mower implement 30 may include a mower support frame 32, a cutter bar 34, a lift and suspension system 36, a pivot head 38, a curtain support apparatus 40, and a curtain 50. The curtain support apparatus 40 and the curtain 50 may be collectively referred to herein as a curtain assembly. The curtain 50 is positioned relative to the cutter bar 34 to cover the cutter bar 34 during operation. FIG. 1B omits the curtain 50 shown in FIG. 1A for clearly illustrating the curtain support apparatus 40. The mower support frame 32 has a first end 322 configured for attachment to a work vehicle (not shown). The work vehicle may be a tractor but can be other type of work vehicle in different implementations. In the present disclosure, the first end 322 is coupled to the work vehicle through a hitch arm 31 but in another implementations, the first end 322 can be coupled to the work vehicle directly or coupled to the work vehicle through different components. The mower support frame 32 also has a second end 324 spaced from the first end 322 along a central longitudinal axis 326 of the mower support frame 32. The cutter bar 34 is attached to the second end 324 of the mower support frame 32. The cutter bar 34 may include or be equipped with a cutter element 342 configured for cutting crop material. The cutter element 342 includes oval-shaped discs 343 with cutter blades attached thereon. The discs 343 are rotatable, driven by a gearset which may receive torque from a power take off (PTO) of the work vehicle, to cut the crop. The cutter bar 34 presents a forward edge 344, a rearward edge 346, an inward edge 348, and outward edge 349 during operation.

The cutter bar 34 is pivotally connected to the second end 324 of the mower support frame 32 to selectively fold the cutter bar 34, with the support of the lift and suspension system 36. The lift and suspension system 36 includes a hydraulic cylinder 362 and a float spring 364. The hydraulic cylinder 362 interconnects the mower support frame 32 and the cutter bar 34, configured to fold the cutter bar 34. When the cutting operation is concluded, the hydraulic cylinder 362 retracts and pivots the cutter bar 34 from an operation position, where the cutter bar 34 is substantially parallel to ground surface, to a folded position, where the angle between the cutter bar 34 and the mower support frame 32 is less than that in the operation position. The folded position of lateral offset mower implement 30 has a smaller width, compared to the operation position, for transportation. The float spring 364 also interconnects the mower support frame 32 and the cutter bar 34 and is configured to balance the down pressure of the cutter bar 34 without damaging the crop stubble/stalk when the cutter bar 34 passes through the field.

A pivot head support 382 may interconnect the pivot head 38 and one of the mower support frame 32 and the cutter bar 34. The pivot head 38 is coupled to the mower support frame 32 proximate the second end 324 through a pivot head support 382. The pivot head support 382 may be a tube or plate disposed perpendicular to the cutter bar 34. The pivot head support 382 is positioned proximate the rearward edge 346 and the inward edge 348 of the cutter bar 34 with a clearance away from the second end 324 of the mower support frame 32 in a direction parallel to the central longitudinal axis 326 of the mower support frame 32 so as to prevent an interference during a folding of the cutter bar 34.

Figure 1C:
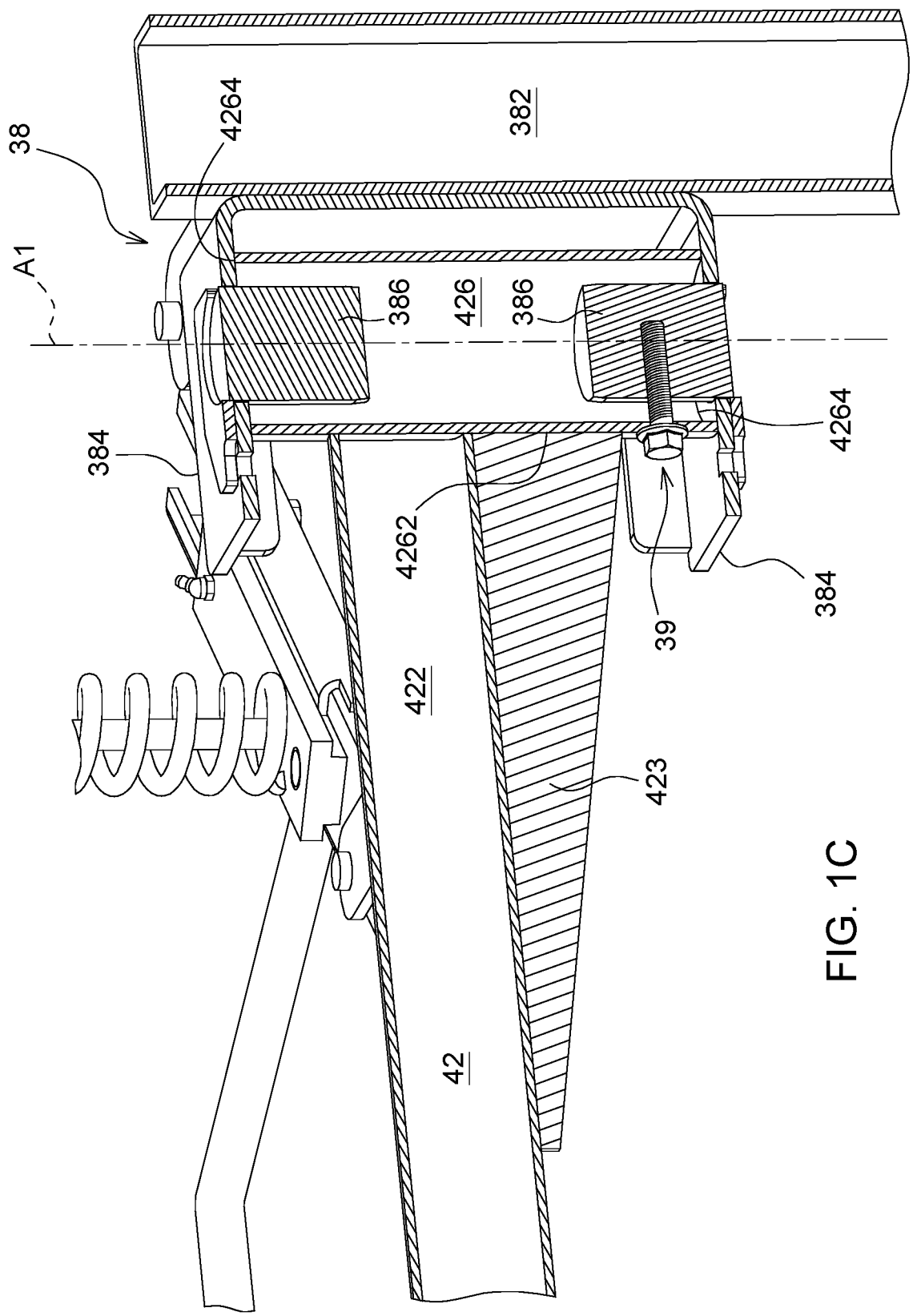
FIG. 1C is a partial enlarged view of the lateral offset mower implement of FIG. 1B to demonstrate a first latch engaged to secure a primary curtain support member against rotation about a first curtain axis.
Figure 1D:
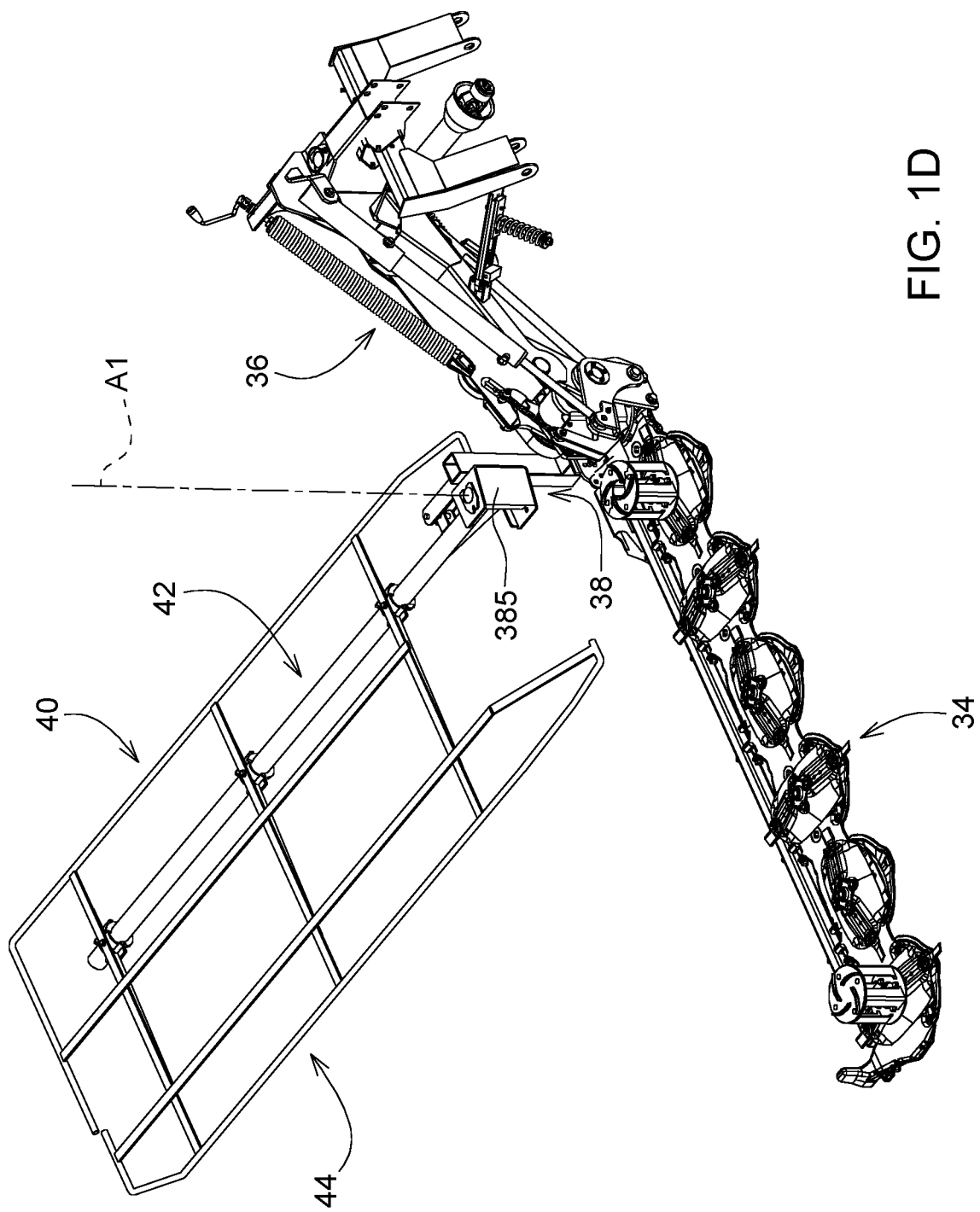
FIG. 1D is a perspective view of the lateral offset mower implement of FIG. 1B where the first latch is disengaged to allow relative rotation of the primary curtain support member about the first curtain axis in another position.
Figure 1E:
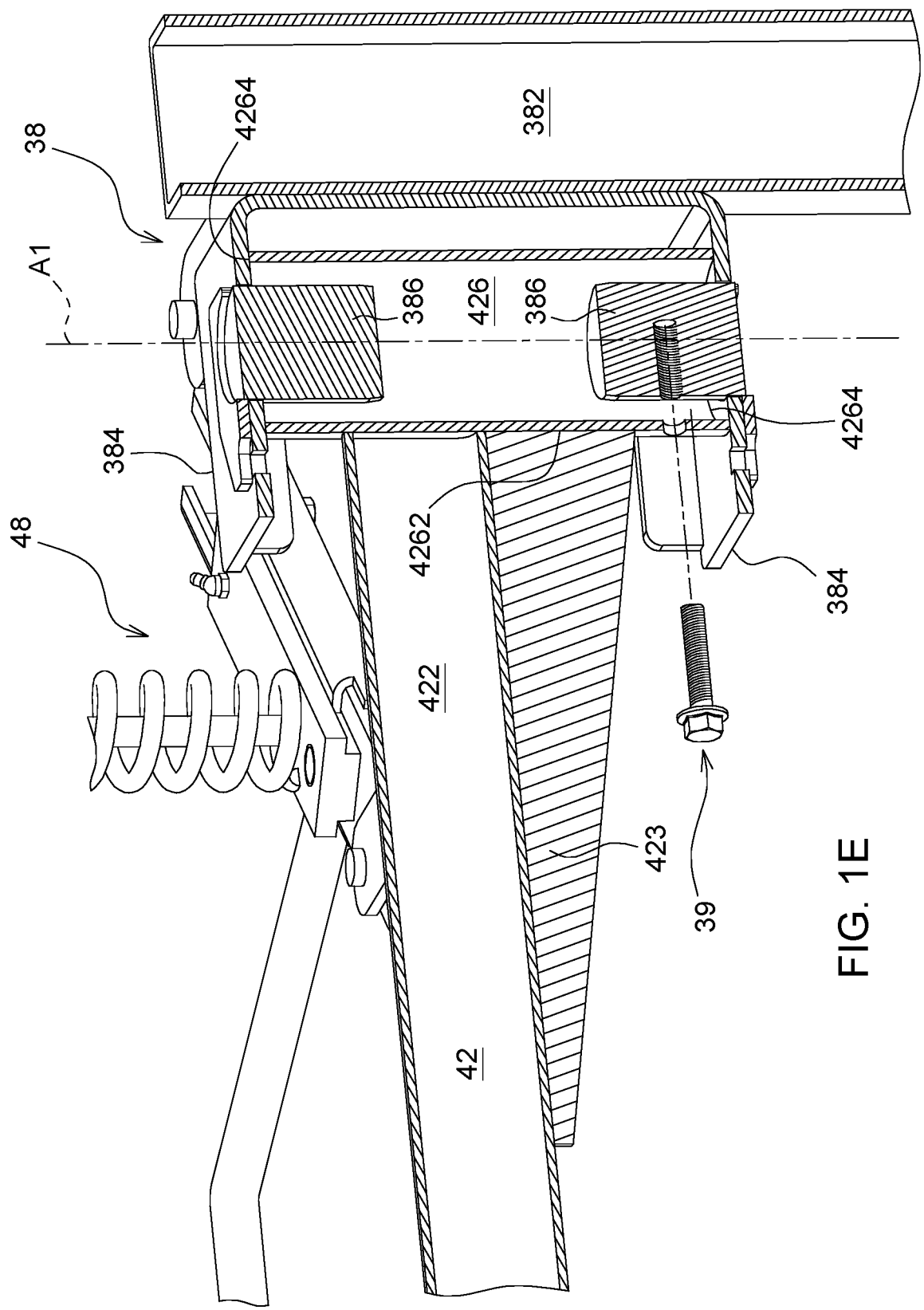
FIG. 1E is a partial enlarged view of the lateral offset mower implement of FIG. 1D to demonstrate the first latch is disengaged.

Referring to FIG. 1B-1E, the pivot head 38 defines a first curtain axis A1, which is generally vertical during operation. The curtain support apparatus 40 includes a primary curtain support member 42, a proximate end 422 of which attached to the pivot head 38 and extending away from the pivot head 38 to a distal end 424 of the primary curtain support member 42. The primary curtain support member 42, in this implementation, is configured as an annular tube between the proximate end 422 and the distal end 424. The primary curtain support member 42 is pivotably attached to the pivot head 38 for relative rotation between the primary curtain support member 42 and the pivot head 38 about the first curtain axis A1. Referring to FIG. 1C, the primary curtain support member 42 includes or couples to a pivoting body 426 (or a short annular tube) having a side 4262 coupled to the proximate end 422 of the primary curtain support member 42. A gusset 423 may be coupled to the pivoting body 426 and the primary curtain support member 42 to support the weight of the primary curtain support member 42. The pivoting body 426 also includes two ends 4264 separated by the side 4262 of the pivoting body 426. The pivot head 38 includes two axial pin stands 384 parallel to and apart from one another and attached to a side of pivot head support 382. One of the axial pin stands 384 (upper) has an axial pin 386 extending downward; the other axial pin stand 384 (lower) has an axial pin 386 extending upward. The two axial pins 386 are aligned with the first curtain axis A1. Each axial pin 386 is coupled between one respective end 4264 of the pivoting body 426 by insertion and the pivoting body 426 is positioned between the axial pin stands 384. As such, the pivoting body 426, along with the primary curtain support member 42 of the curtain support apparatus 40, can rotate relative to the axial pins 386 of the pivot head 38, as shown in FIGS. 1D and 1E. Optionally, a stop plate 385 is coupled between front edges of the two axial pin stands 384, so as to stop or limit the primary curtain support member 42 from pivoting forward relative to and passing the central longitudinal axis 326 of the mower support frame 32.

The lateral offset mower implement 30 also includes a first latch 39 interconnecting the pivot head 38 or pivot head support 382 and the primary curtain support member 42. The first latch 39 is engageable to secure the primary curtain support member 42 against rotation about the first curtain axis A1. The first latch 39 is also disengageable to allow relative rotation of the primary curtain support member 42 about the first curtain axis A1. As shown in FIG. 1C, the first latch 39, configured as a latch bolt or pin, inserts to the pivoting body 426 of the primary curtain support member 42 and one of the axial pins 386 to secure the primary curtain support member 42 against rotation about the first curtain axis A1. The first latch 39 is configured to remove from the primary curtain support member 42 and the pivoting body 426 to allow relative rotation of the primary curtain support member 42 about the first curtain axis A1, as shown in FIG. 1E. In this regard, the operator can easily conduct the service to the cutter bar 34 by pivoting the curtain support apparatus 40 to expose the cutter bar 34.

Figure 2A:
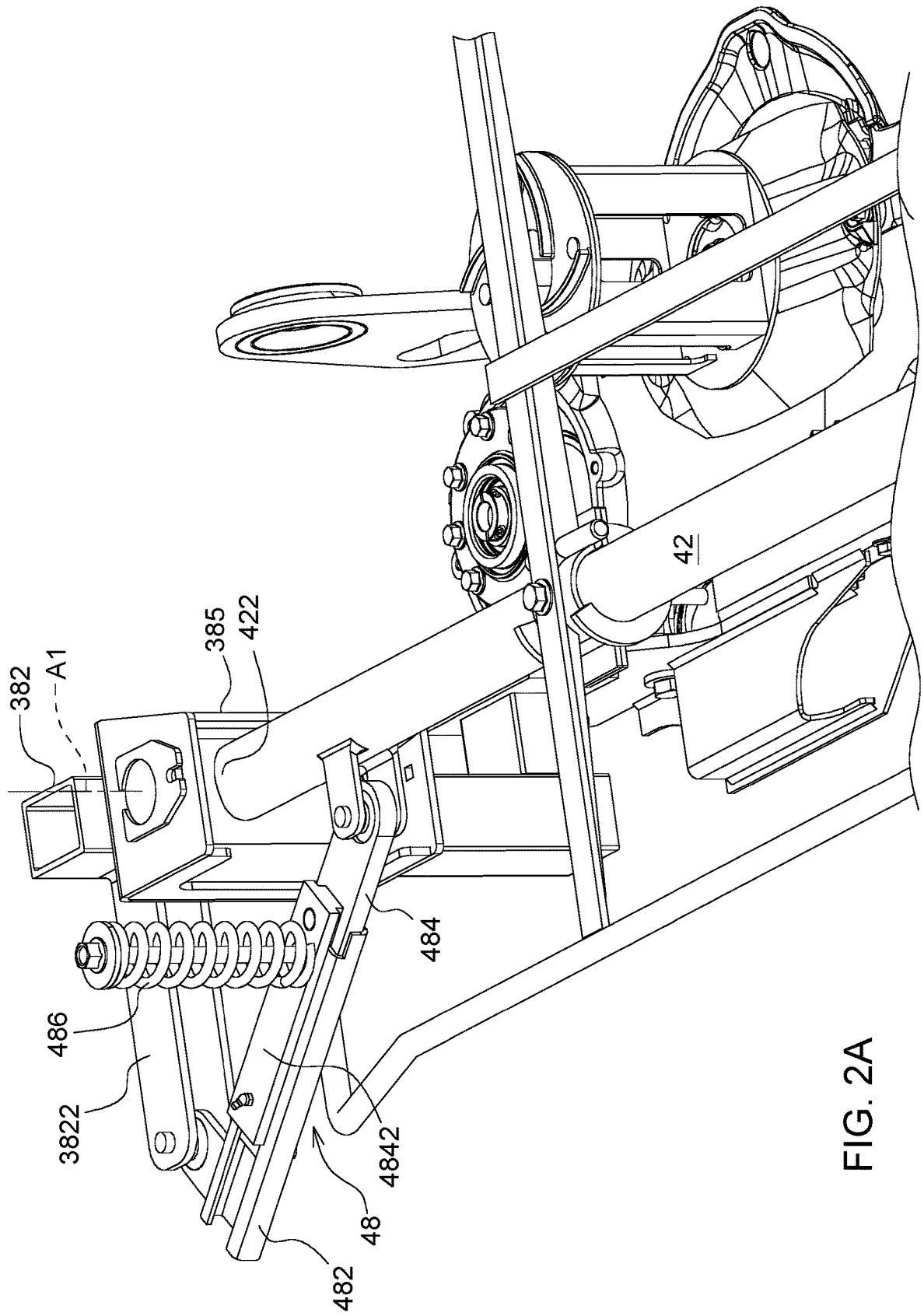
FIG. 2A is a perspective view of the lateral offset mower implement of FIG. 1B where the break-away release extends to allow the primary curtain support member to rotate rearward.
Figure 2B:
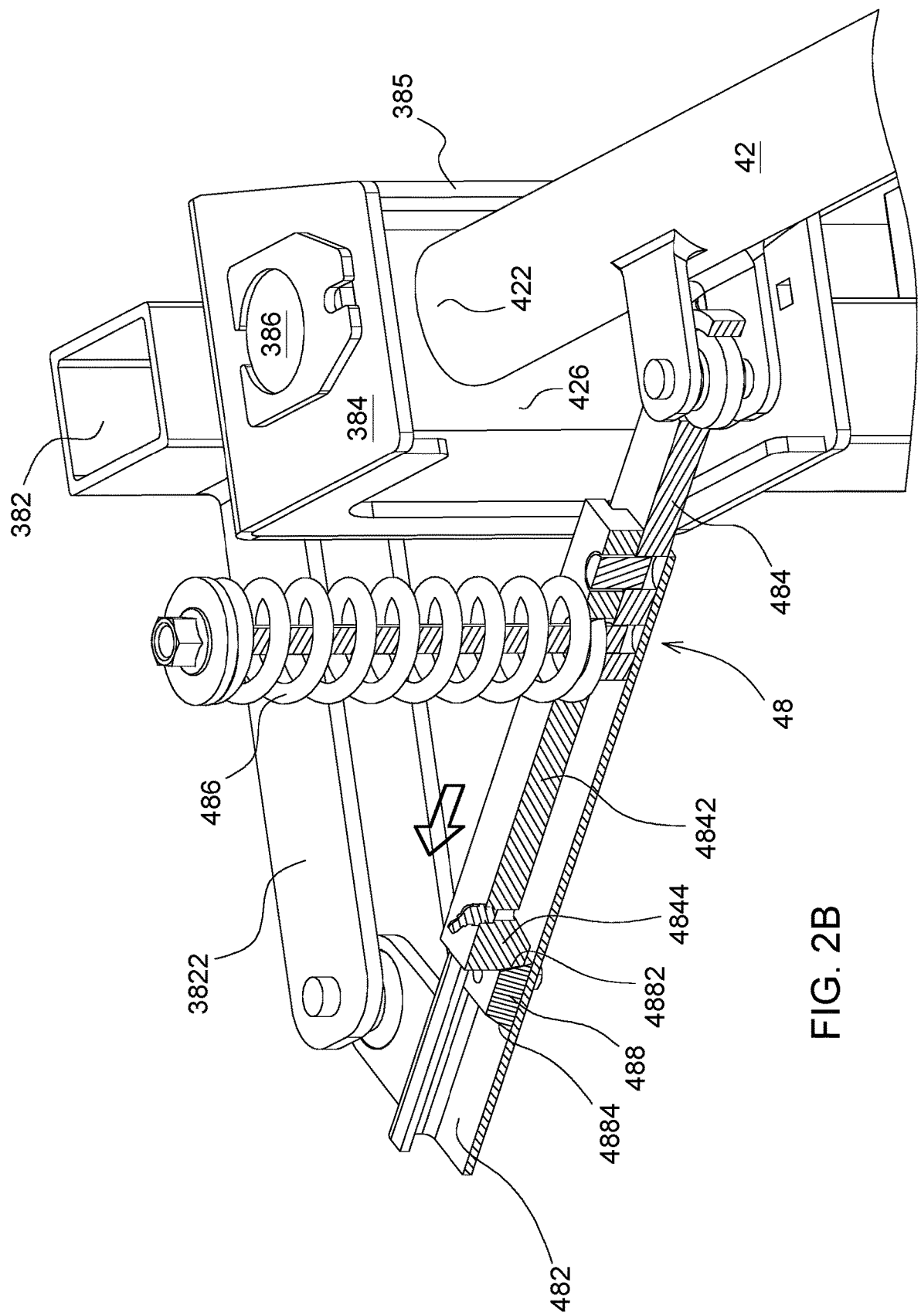
FIG. 2B is a partial enlarged view of the break-away release that provides break away function.

Alternatively or in addition to the first latch 39 as shown in FIGS. 1C-1E, a break-away release 48 may be provided, as shown in FIGS. 1B, and 2A-2B. In another implementation, the break-away release 48 is included when the first latch 39, such as the latch bolt or pin, is removed. The break-away release 48 pivotally interconnects the primary curtain support member 42 and an extension 3822 of the pivot head support 382. The break-away release 48 is operable to secure the primary curtain support member 42 in a first position during operation and to enable rotation of the primary curtain support member 42 relative to the mower support frame 32 and about the first curtain axis A1 in response to a force applied to the primary curtain support member 42 having magnitude greater than a threshold value.

The break-away release 48 includes a channel piece 482, a sliding piece 484 moveably positioned at the track of the channel piece 482, a spring 486 positioned on an upper piece 4842 of the sliding piece 484, and a block 488. The upper piece 4842 includes a claw 4844 configured to engage with a first side 4882 or second side 4884 of the block 488. When the force applied to the primary curtain support member 42 is greater than the threshold value, the spring is compressed, the sliding piece 484, with the upper piece 4842, moves to retract the break-away release 48, the primary curtain support member 42 rotates, and one side of the claw 4844 is engaged with the first side 4882 of the block 488 and sliding upward. The spring 486 presses the upper piece 4842 to resist the claw 4844 from climbing along the first side 4882. The spring 486 may further press the claw 4844 return to the original position, so as to return the primary curtain support member 42 to its original position that is parallel to the cutter bar 34. When the curtain support apparatus 40 encounters an object such as a bush, the curtain support apparatus 40 is allowed to temporally independently rotate rearward relative to the cutter bar 34, with the cutter bar 34 remaining at the same position. As such, the cutter bar 34 may keep severing the crop during the operation without the interruption from the object. The curtain support apparatus 40 is returned to its original position by the break-away release 48 after the interruption of the object removed.

Figure 2C:
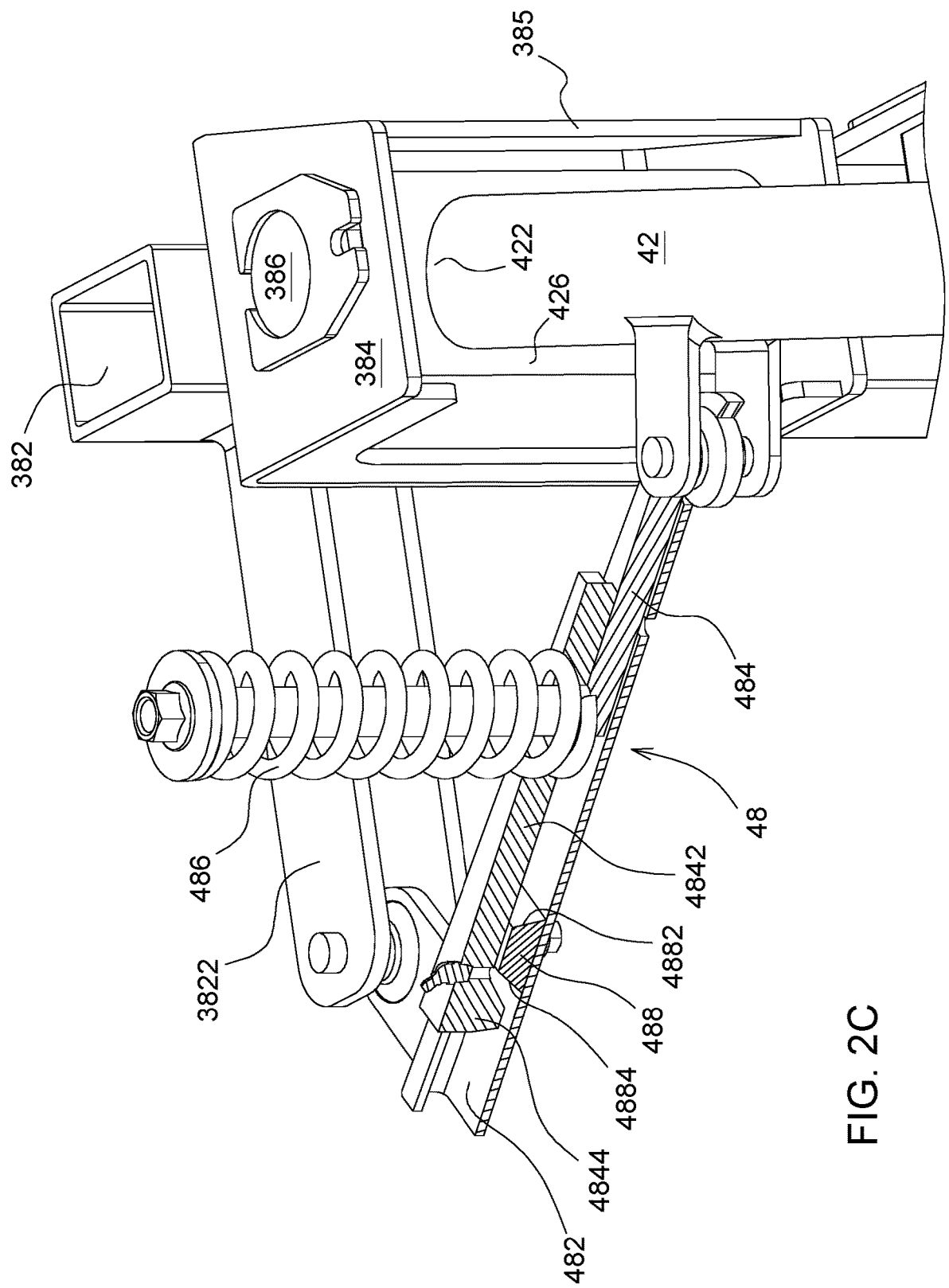
FIG. 2C is a partial enlarged view of the break-away release that needs to be reset.

When the break-away release 48 retracts further, the claw 4844 may slide over the block 488, as shown in FIG. 2C. Another side of the claw 4844 would engage the second side 4884 of the block 488. The operator may then reset the break-away release 48. The first side 4882 of the block 488 is steeper than the second side 4884 of the block 488, such that it would be harder to slide over the block 488 but easier to reset.

The curtain 50 is supported by the curtain support apparatus 40. The curtain support apparatus 40 may include a curtain support frame 44 attached to the primary curtain support member 42 and supporting the curtain 50. In particular, the curtain support frame 44 is configured to support the curtain 50 over a coverage area covering the cutter bar 34, as shown in FIG. 1A. The curtain 50 may directly attach on the curtain support frame 44. Referring to FIGS. 1A and 1B, the curtain support frame 44 may include a boundary piece 442 and a cross pieces 444 coupled to the boundary piece 442. The boundary piece 442 may define a portion of the curtain 50 as the coverage area covering the top of the cutter bar 34 during operation. The remaining portion of the curtain 50 may fall from the boundary piece 442 and may cover the forward edge 344, rearward edge 346, and outward edge 349 of the cutter bar 34. The cross pieces 444 interconnect two different locations of the boundary piece 442 to support the weight of the curtain 50 defined within the boundary piece 442.

Figure 3:
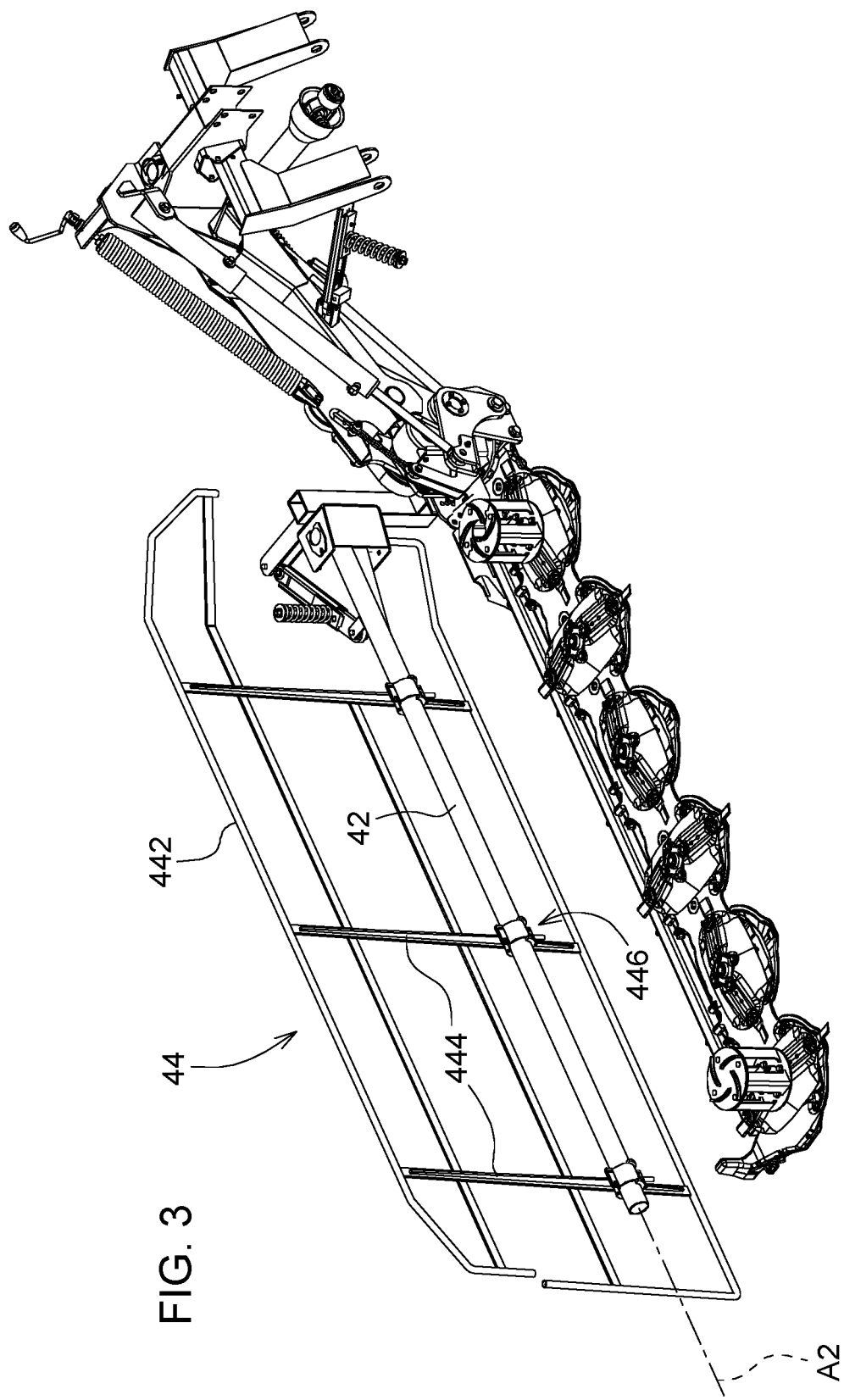
FIG. 3 is a perspective view of the lateral offset mower implement of FIG. 1B where the second latch is disengaged to allow relative rotation of the curtain support frame about a second curtain axis in another position.

Referring to FIGS. 1B and 3, the curtain 50 may be rotatable relative to the primary curtain support member 42 about a second curtain axis A2. The second curtain axis A2 is generally horizontal during operation. The second curtain rotation axis A2 is aligned with an extension of the primary curtain support member 42, and the curtain support frame 44 is rotatable relative to the primary curtain support member 42.

Referring to FIGS. 3, the primary curtain support member 42 includes a cylindrical outer surface. For example, the primary curtain support member 42 may be an annular tube. The curtain support frame 44 is rotatably coupled to the primary curtain support member 42 between a working position where the curtain covers the cutter element 342 (FIGS. 1A and 1B) and an open position where the curtain support frame 44 is rotated in a direction to expose the cutter element 342 (FIG. 3, with the curtain 50 omitted for clarity). The operator can easily conduct the service to the cutter bar 34 or clean the crop debris attached on the back of the curtain 50.

The curtain support apparatus 40 may have a saddle(s) or ring(s) coupled to the curtain support frame 44 and having an inside diameter larger than an outside diameter of the primary curtain support member 42, such that the curtain support frame 44 is rotatably coupled to the primary curtain support member 42 when a section of the primary curtain support member 42 is surrounded by the saddle or ring. As shown in FIG. 3, 4A-4C, three saddles 446 are provided. Each saddle 446 includes a first halve 4462 and a second halve 4464 cooperating with the first halve 4462 to surround a section of the primary curtain support member 42. The first halve 4462 is mounted on the curtain support frame 44. As shown in FIGS. 1B and 3, three first halves 4462 of the three saddles 446 are mounted on three respective cross pieces 444 of the curtain support frame 44. The three second halves 4464 are mounted to respective first halves 4462 through nuts and bolts or other means.

The curtain support apparatus 40 may include a second latch(s) 43 engageable to secure the curtain support frame 44 against rotation about the second curtain axis A2 and disengageable to allow relative rotation of the curtain support frame 44 about the second curtain axis A2. The second latch 43, referred to FIGS. 4A and 4B, may include a bolt 432 (or pin) positioned through the primary curtain support member 42 and at least one of the first halve 4462 and second halve 4464. The bolt 432 may also be positioned into the cross piece 444.

Figure 4A:
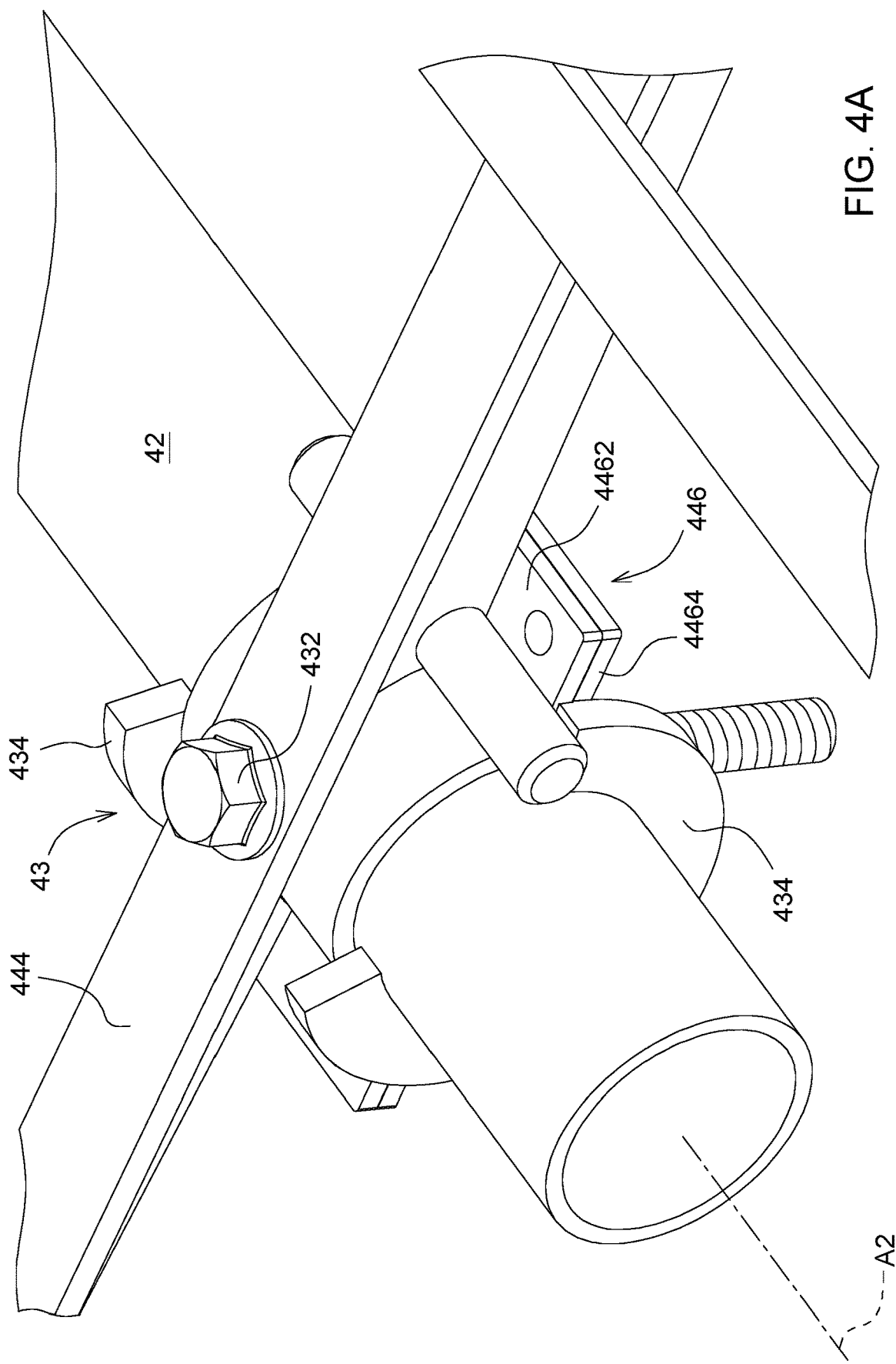
FIG. 4A is a partial enlarged view of the lateral offset mower implement of FIG. 1B to demonstrate a second latch of one implementation engaged to secure a curtain support frame against rotation about a second curtain axis.
Figure 4B:
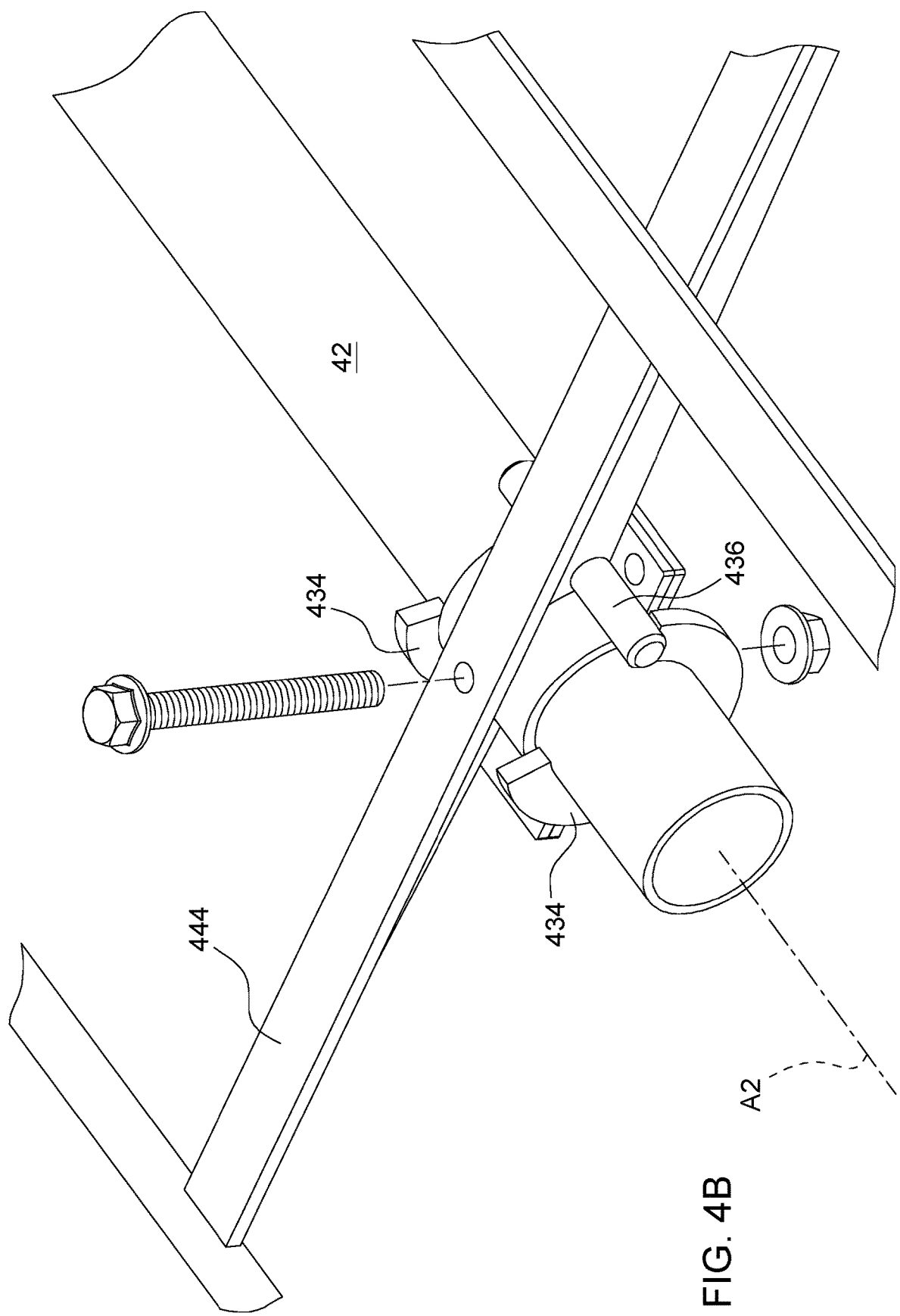
FIG. 4B demonstrates the second latch of FIGS. 3 and 4A disengaged.
Figure 4C:
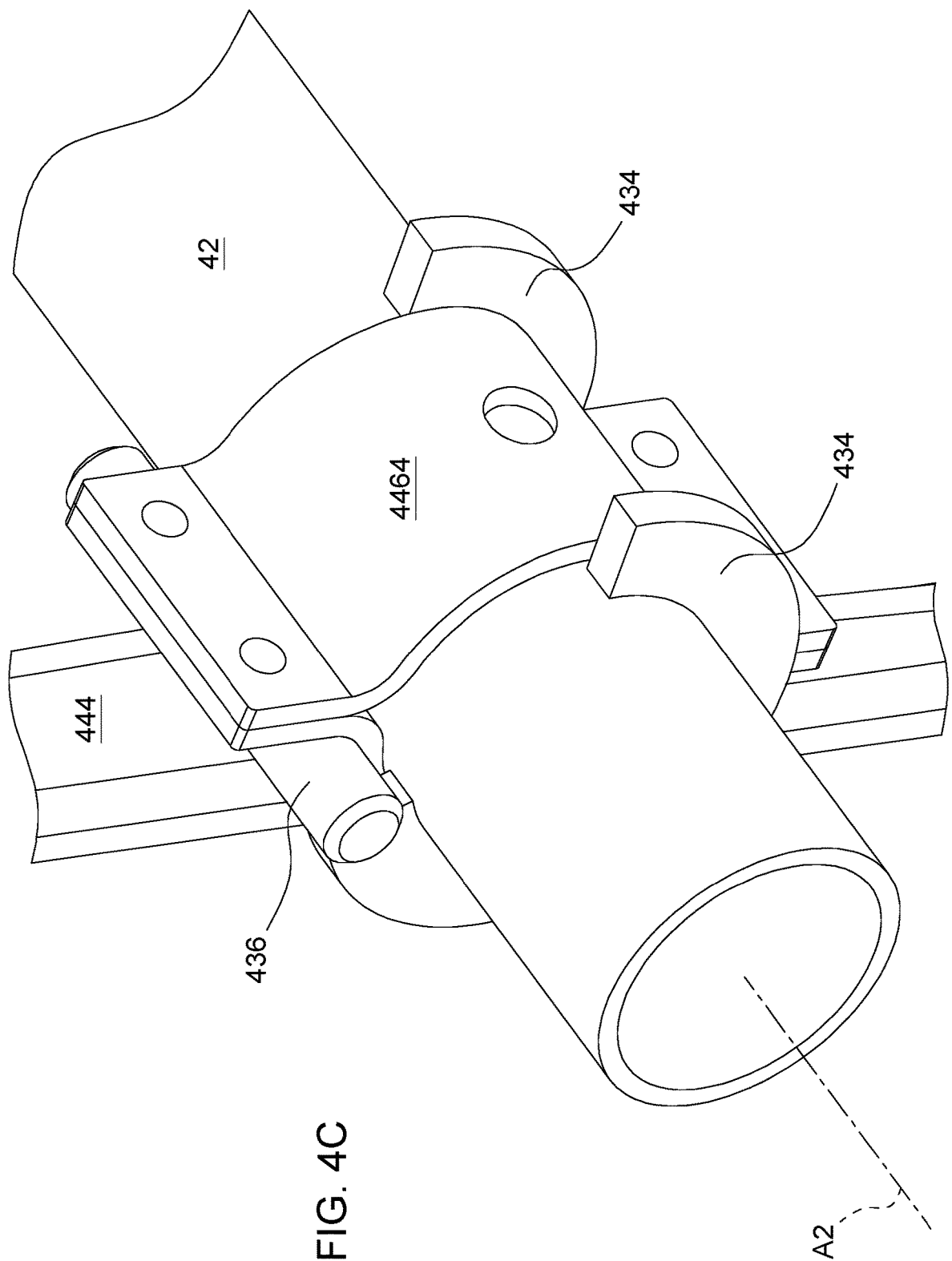
FIG. 4C demonstrates the second latch of FIGS. 3 and 4A disengaged and the curtain support frame rotating about the second curtain axis in another position.

In another implementation, the second latch 43 may include one or more C shape stop 434 attached on the primary curtain support member 42. When the saddle 446 is positioned between the two C shape stops 434, the C shape stops 434 prevent the curtain support frame 44 from sliding axially along the primary curtain support member 42. In addition, the second latch 43 may include a pin 436 coupled to saddle 446 or cross piece 444, and the pin 436 may abut or engage one end of one of the C shape stops 434, so as to limit the range of rotation of the curtain support frame 44 about the second curtain axis A2, which is defined by the two ends of each C shape stops 434, as shown in FIGS. 4B and 4C. For example, when the bolt 432 is removed, the pin 436, rotating with the saddle 446, moves from one end of the C shape stop 434 (FIG. 4B) to the other end of the C shape stop 434 (FIG. 4C).

Figure 5:
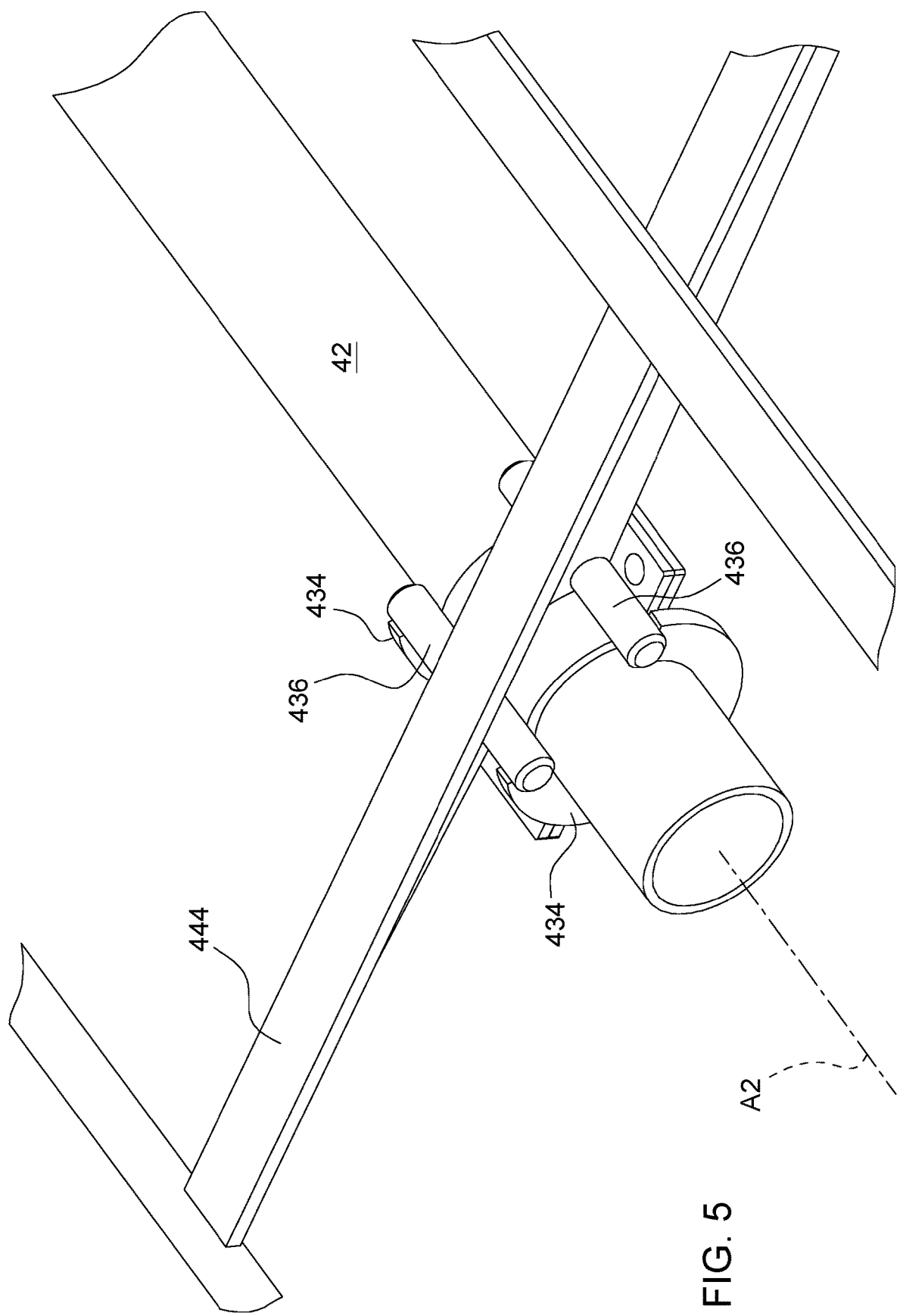
FIG. 5 is a partial enlarged view of the lateral offset mower implement of FIG. 1B to demonstrate a second latch having to two pins to secure a curtain support frame against rotation about the second curtain axis.

Referring to FIG. 5, the second latch 43 may include two pins 436 coupled to saddle 446 or cross piece 444, and each pin 436 is selectively moved to abut or engage respective end of one of the C shape stops 434, so as to secure the saddle 446 on the curtain support frame 44 against rotation relative to the primary curtain support member 42.

Without in any way limiting the scope, interpretation, or application of the claims appearing below, a technical effect of one or more of the example embodiments disclosed herein is to pivot the curtain support apparatus for the operator to service the cutter bar or clean the curtain. Another technical effect of one or more of the example embodiments disclosed herein is to provide a break away mechanism for the curtain support apparatus, such that, in operation, when the curtain support apparatus encounters an object, it can pivot with certain degrees and return, without interrupting the cutter bar's cutting performance.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A lateral offset mower implement comprising:
    a mower support frame having a first end configured for attachment to a work vehicle, and a second end spaced from the first end along a central longitudinal axis of the mower support frame;
    a pivot head coupled to the mower support frame proximate the second end thereof, the pivot head defining a first curtain axis, wherein the first curtain axis is generally vertical during operation;
    a curtain support apparatus having a primary curtain support member attached to the pivot head and extending away from the pivot head to a distal end;
    a curtain supported by the curtain support apparatus;
    a cutter bar attached to the second end of the mower support frame; and
    a curtain support frame attached to the primary curtain support member and supporting the curtain;

wherein the cutter bar includes a cutter element configured for cutting crop material
wherein the primary curtain support member is pivotably attached to the pivot head for relative rotation between the primary curtain support member and the pivot head about the first curtain axis;
wherein the curtain is positioned relative to the cutter bar to cover the cutter bar during operation;
wherein the curtain support frame is configured to support the curtain over a coverage area covering the cutter bar;
wherein a second curtain axis is aligned with an extension of the primary curtain support member, and the curtain support frame is rotatable relative to the primary curtain support member.

2. The lateral offset mower implement set forth in claim 1, wherein the primary curtain support member includes a cylindrical outer surface, and the curtain support frame is rotatably coupled to the primary curtain support member between a working position where the curtain covers the cutter element and an open position where the curtain support frame is rotated in a direction to expose the cutter element.

3. The mower implement set forth in claim 2, further comprising a saddle or ring coupled to the curtain support frame and having an inside diameter larger than an outside diameter of the primary curtain support member.

4. The mower implement set forth in claim 3, wherein the saddle includes a first halve and a second halve cooperating with the first halve to surround a section of the primary curtain support member, and the first halve is mounted on the curtain support frame.

5. The lateral offset mower implement set forth in claim 1, further comprising a second latch, wherein the second latch is engageable to secure the curtain support frame against rotation about the second curtain axis, and disengageable to allow relative rotation of the curtain support frame about the second curtain axis.

6. A lateral offset mower implement comprising:
a mower support frame having a first end configured for attachment to a work vehicle, and a second end spaced from the first end along a central longitudinal axis of the mower support frame;
a pivot head coupled to the mower support frame proximate the second end thereof, the pivot head defining a first curtain axis, wherein the first curtain axis is generally vertical during operation;
a curtain support apparatus having a primary curtain support member attached to the pivot head and extending away from the pivot head to a distal end;
a curtain supported by the curtain support apparatus; and
a break-away release interconnecting the primary curtain support member and a pivot head support configured to support the pivot head;
wherein the primary curtain support member is pivotably attached to the pivot head for relative rotation between the primary curtain support member and the pivot head about the first curtain axis, and the break-away release is operable to secure the primary curtain support member in a first position during operation and to enable rotation of the primary curtain support member relative to the mower support frame and about the first curtain axis in response to a force applied to the primary curtain support member having magnitude greater than a threshold value.

7. The lateral offset mower implement set forth in claim 6, wherein the curtain is rotatable relative to the primary curtain support member about a second curtain axis, the second curtain axis is aligned with an extension of the primary curtain support member.

8. The lateral offset mower implement set forth in claim 7, wherein the second curtain axis is generally horizontal during operation.

9. The lateral offset mower implement set forth in claim 6, further comprising a cutter bar attached to the second end of the mower support frame, wherein the cutter bar includes a cutter element configured for cutting crop material.

10. The lateral offset mower implement set forth in claim 9, wherein the curtain is positioned relative to the cutter bar to cover the cutter bar during operation.

11. The lateral offset mower implement set forth in claim 10, further comprising a curtain support frame attached to the primary curtain support member and supporting the curtain, wherein the curtain support frame is configured to support the curtain over a coverage area covering the cutter bar.

12. A lateral offset mower implement comprising:
a mower support frame having a first end configured for attachment to a work vehicle, and a second end spaced from the first end along a central longitudinal axis of the mower support frame;
a pivot head coupled to the mower support frame proximate the second end thereof, the pivot head defining a first curtain axis, wherein the first curtain axis is generally vertical during operation;
a curtain support apparatus having a primary curtain support member attached to the pivot head and extending away from the pivot head to a distal end;
a curtain supported by the curtain support apparatus;
a pivot head support interconnecting the pivot head and one of the mower support frame and the cutter bar; and
a cutter bar attached to the second end of the mower support frame;
wherein the primary curtain support member is pivotably attached to the pivot head for relative rotation between the primary curtain support member and the pivot head about the first curtain axis, and the cutter bar includes a cutter element configured for cutting crop material.

13. The lateral offset mower implement set forth in claim 12, wherein the cutter bar presents a forward edge and a rearward edge during operation, with the pivot head support positioned proximate the rearward edge of the cutter bar.

14. The lateral offset mower implement set forth in claim 13, wherein the cutter bar is pivotally connected to the second end of the mower support frame to selectively fold the cutter bar, and the pivot head support is positioned proximate an inward edge of the cutter bar with a clearance away from the mower support frame in a direction parallel to the central longitudinal axis of the mower support frame so as to prevent an interference during a folding of the cutter bar.

15. A lateral offset mower implement comprising:
a mower support frame having a first end configured for attachment to a work vehicle, and a second end spaced from the first end along a central longitudinal axis of the mower support frame;
a pivot head coupled to the mower support frame proximate the second end thereof, the pivot head defining a first curtain axis, wherein the first curtain axis is generally vertical during operation;
a curtain support apparatus having a primary curtain support member attached to the pivot head and extending away from the pivot head to a distal end;
a curtain supported by the curtain support apparatus; and a first latch interconnecting the pivot head or pivot head support and the primary curtain support member, wherein the primary curtain support member is pivotably attached to the pivot head for relative rotation between the primary curtain support member and the pivot head about the first curtain axis, and the first latch is engageable to secure the primary curtain support member against rotation about the first curtain axis, and disengageable to allow relative rotation of the primary curtain support member about the first curtain axis.

16. A lateral offset mower implement comprising:
a mower support frame having a first end configured for attachment to a work vehicle, and a second end spaced from the first end along a central longitudinal axis of the mower support frame;
a pivot head coupled to the mower support frame proximate the second end thereof, the pivot head defining a first curtain axis, wherein the first curtain axis is generally vertical during operation;
a curtain support apparatus having a primary curtain support member attached to the pivot head and extending away from the pivot head to a distal end;
a curtain supported by the curtain support apparatus; and
wherein the primary curtain support member is pivotably attached to the pivot head for relative rotation between the primary curtain support member and the pivot head about the first curtain axis, and the primary curtain support member includes a pivoting body having a side coupled to a proximate end of the primary curtain support member and two ends separated by the side of the pivoting body, the pivot head includes an axial pin stand attached to a side of a pivot head support and axial pin coupled between one end of the pivoting body and the axial pin stand and aligned with the first curtain axis.

17. The lateral offset mower implement set forth in claim 16, further comprising a first latch, wherein the first latch is configured to insert to the pivoting body of the primary curtain support member and the axial pin to secure the primary curtain support member against rotation about the first curtain axis, and is configured to remove from the primary curtain support member and the pivoting body to allow relative rotation of the primary curtain support member about the first curtain.

* * * * *